United States Patent
O'Connor et al.

(10) Patent No.: US 12,366,217 B2
(45) Date of Patent: Jul. 22, 2025

(54) ELECTRIC MACHINE ASSEMBLY

(71) Applicant: General Electric Company, Schenectady, NY (US)

(72) Inventors: Ethan Patrick O'Connor, Hamilton, OH (US); Gert Johannes van der Merwe, Lebanon, OH (US); Alexander Thomas Hills, Cincinnati, OH (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/085,728

(22) Filed: Dec. 21, 2022

(65) Prior Publication Data
US 2024/0209775 A1 Jun. 27, 2024

(51) Int. Cl.
F02K 3/06 (2006.01)
B64D 27/33 (2024.01)
F01D 15/10 (2006.01)
F02C 7/32 (2006.01)

(52) U.S. Cl.
CPC ............... F02K 3/06 (2013.01); F01D 15/10 (2013.01); B64D 27/33 (2024.01); F02C 7/32 (2013.01); F05D 2220/76 (2013.01); F05D 2240/62 (2013.01)

(58) Field of Classification Search
CPC .. F02K 1/00–827; F02K 1/04; F02K 3/00–12; F02K 5/00–026; F05D 2220/76–77; F05D 2230/642; F02C 7/32; F02C 6/206; B64D 2013/0644; B64D 27/33; B64D 27/35–359; B64D 31/18; B64D 35/022–026; B64D 33/04–06; B64D 27/30–33; B64D 31/16–18; B64D 35/02–08; F01D 15/10; F01D 25/30–305; B60K 6/20–547; H02K 7/1823; B60L 50/10–14; B60L 50/16
See application file for complete search history.

(56) References Cited

U.S. PATENT DOCUMENTS

| | | | |
|---|---|---|---|
| 5,376,827 A | 12/1994 | Hines | |
| 6,092,360 A | 7/2000 | Hoag et al. | |
| 7,134,271 B2 * | 11/2006 | Baughman | F02K 3/077 60/228 |
| 9,097,134 B2 | 8/2015 | Ferch et al. | |
| 9,917,490 B2 | 3/2018 | Lemmers et al. | |
| 10,093,428 B2 | 10/2018 | Kupiszewski et al. | |
| 10,308,366 B2 | 6/2019 | Kupiszewski et al. | |
| 10,487,839 B2 | 11/2019 | Kupiszewski et al. | |
| 10,550,764 B2 | 2/2020 | Roberge | |
| 10,801,410 B2 | 10/2020 | Roberge | |

(Continued)

FOREIGN PATENT DOCUMENTS

CA 2831625 A1 4/2015
FR 3135754 A1 * 11/2023

Primary Examiner — Stephanie Sebasco Cheng
(74) Attorney, Agent, or Firm — Dority & Manning, P.A.

(57) ABSTRACT

A hybrid electric gas turbine engine is provided. The hybrid electric gas turbine engine includes: a turbomachine having a compressor section and a turbine section arranged in serial flow order, the compressor section and turbine section together defining a core air flowpath, the turbomachine defining a core air flowpath exhaust; and an electric machine assembly having an electric machine disposed aft of the core air flowpath exhaust and mechanically connected to the turbine section.

13 Claims, 5 Drawing Sheets

(56) References Cited

U.S. PATENT DOCUMENTS

| | | |
|---|---|---|
| 10,951,095 B2 | 3/2021 | Miller et al. |
| 11,156,128 B2 | 10/2021 | Miller et al. |
| 11,242,156 B2 | 2/2022 | Spierling |
| 11,247,779 B2 | 2/2022 | Kupiszewski et al. |
| 11,319,882 B2 * | 5/2022 | Kupratis ................ F02C 6/14 |
| 11,655,732 B2 * | 5/2023 | Kassab ................ F01D 25/243 |
| | | 415/144 |
| 2019/0085715 A1 * | 3/2019 | van der Merwe ...... F02C 3/067 |
| 2021/0018008 A1 | 1/2021 | Muldoon |
| 2021/0281145 A1 | 9/2021 | Lemmers, Jr. |
| 2021/0355881 A1 | 11/2021 | Lefebvre |
| 2022/0045573 A1 | 2/2022 | Seki et al. |
| 2022/0195887 A1 | 6/2022 | Hanczewski et al. |
| 2022/0316403 A1 | 10/2022 | Alecu et al. |

* cited by examiner

ELECTRIC MACHINE ASSEMBLY

FEDERALLY SPONSORED RESEARCH

This invention was made with government support under contract number NNC15BA05B/80GRC20F0188 awarded by the National Aeronautics and Space Administration. The U.S. government may have certain rights in the invention.

FIELD

The present disclosure generally relates to a gas turbine engine and an electric machine assembly.

BACKGROUND

Typical aircraft propulsion systems include one or more gas turbine engines. For certain propulsion systems, the gas turbine engines generally include a fan and a core arranged in flow communication with one another. Additionally, the core of the gas turbine engine general includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gasses through the turbine section drives the turbine section and is then routed through the exhaust section, e.g., to atmosphere.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
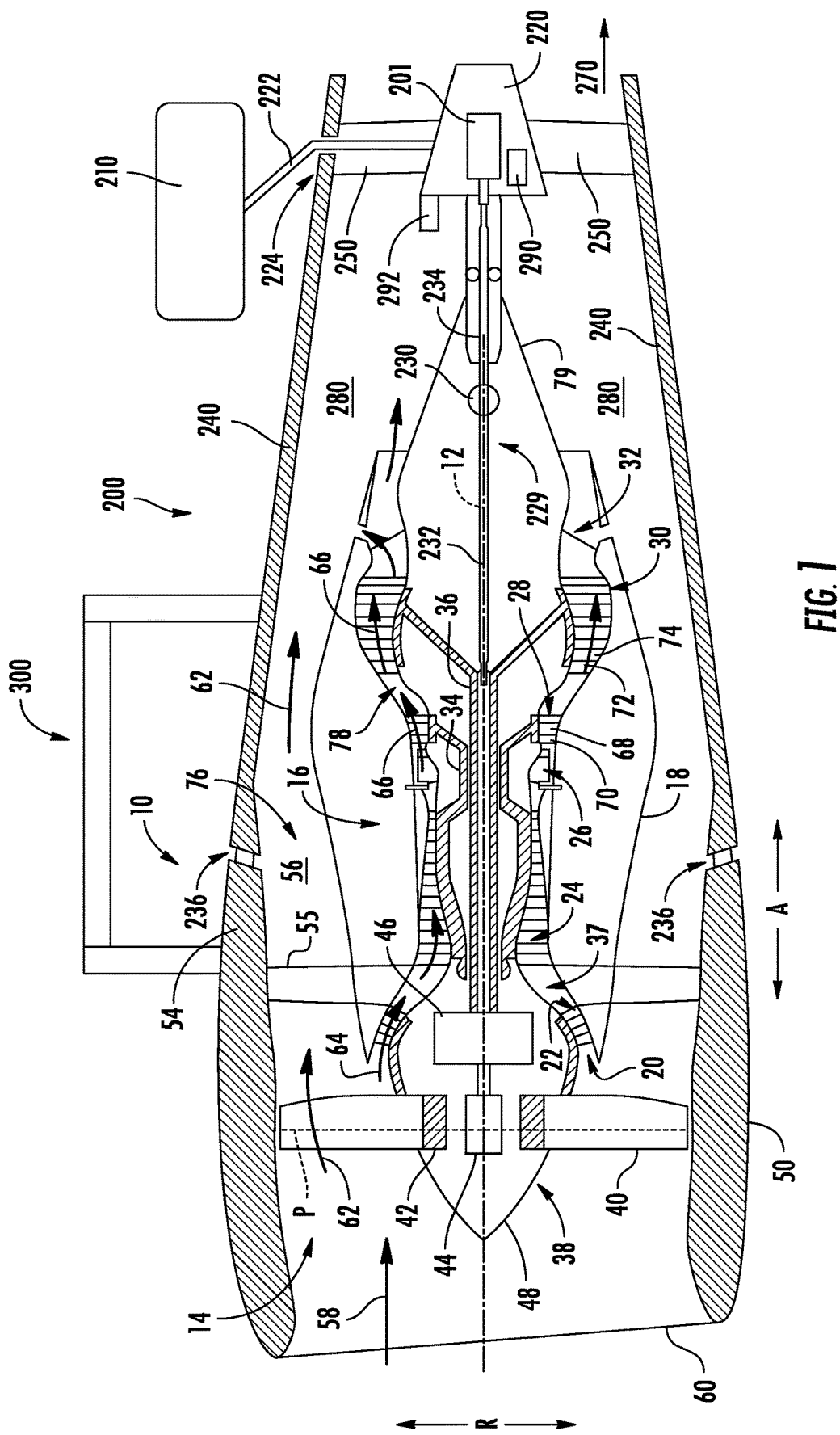
FIG. 1 is a schematic sectional view of a gas turbine engine and electric machine assembly in accordance with an exemplary embodiment of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The singular forms "a", "an", and "the" include plural references unless the context clearly dictates otherwise.

The term "at least one of" in the context of, e.g., "at least one of A, B, and C" refers to only A, only B, only C, or any combination of A, B, and C.

The term "turbomachine" or "turbomachinery" refers to a machine including one or more compressors, a heat generating section (e.g., a combustion section), and one or more turbines that together generate a torque output.

The term "gas turbine engine" refers to an engine having a turbomachine as all or a portion of its power source. Example gas turbine engines include turbofan engines, turboprop engines, turbojet engines, turboshaft engines, etc., as well as hybrid-electric versions of one or more of these engines.

The term "combustion section" refers to any heat addition system for a turbomachine. For example, the term combustion section may refer to a section including one or more of a deflagrative combustion assembly, a rotating detonation combustion assembly, a pulse detonation combustion assembly, or other appropriate heat addition assembly. In certain example embodiments, the combustion section may include an annular combustor, a can combustor, a cannular combustor, a trapped vortex combustor (TVC), or other appropriate combustion system, or combinations thereof.

The terms "low" and "high", or their respective comparative degrees (e.g., -er, where applicable), when used with a compressor, a turbine, a shaft, or spool components, etc. each refer to relative speeds within an engine unless otherwise specified. For example, a "low pressure turbine" or "low speed turbine" defines a component configured to operate at a rotational speed, such as a maximum allowable rotational speed, lower than a "high pressure turbine" or "high speed turbine" of the engine.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

As may be used herein, the terms "axial" and "axially" refer to directions and orientations that extend substantially parallel to a centerline of the gas turbine engine. Moreover, as may be used herein, the terms "radial" and "radially" refer to directions and orientations that extend substantially perpendicular to the centerline of the gas turbine engine. In addition, as used herein, the terms "circumferential" and "circumferentially" refer to directions and orientations that extend arcuately about the centerline of the gas turbine engine.

For certain aircraft, it may be beneficial for the propulsion system to include an electric fan to supplement propulsive power provided by the one or more gas turbine engines included with the propulsion system. Accordingly, a propulsion system for an aircraft having one or more gas turbine engines and electric generators capable of providing an electric fan, or other electric propulsor, with a desired amount of electrical power would be useful.

Electric machines may benefit the operation and efficiency of a gas turbine engine. For example, an electric machine can recuperate power generated by a gas turbine engine and/or provide power to the gas turbine engine in one or more operating conditions. A configuration of a gas turbine engine including an electric machine may be referred to herein as a hybrid electric gas turbine engine.

A hybrid electric gas turbine engine may include an electric machine connected with one or more shafts of the turbomachine. Positioning of an electric machine to provide torque to and/or receive torque from the turbomachine may be limited by various packaging aspects of a given engine design. In many such configurations, removal, analysis, and servicing of the electric machine may prove difficult or cumbersome. An electric machine assembly of the present disclosure may facilitate easy removal, analysis, maintenance, and tuning of an electric machine. For example, the present disclosure provides an aft-mounted electric machine assembly that may be used in testing an analysis of the electric machine.

Referring now to the drawings, wherein identical numerals indicate the same elements throughout the figures, FIG. 1 is a schematic cross-sectional view of a hybrid electric gas turbine engine assembly in accordance with an exemplary embodiment of the present disclosure having a gas turbine engine and an electric machine assembly 200. More particularly, for the embodiment of FIG. 1, the gas turbine engine is a high-bypass turbofan jet engine 10, referred to herein as "gas turbine engine 10." The term "high-bypass" refers the engine 10 having a bypass ratio greater than 8:1 and up to 25:1. Such may generally result in a more efficient gas turbine engine by driving more air through a bypass airflow passage 56 for less air going through a core of the engine 10 (e.g., through an inlet 20). As will be appreciated from the description hereinbelow and FIG. 1, the engine 10 is operable with an electric machine 201 to transfer torque to or from the electric machine 201, and as such the engine 10 may be referred to as a hybrid electric gas turbine engine, as noted above.

As shown in FIG. 1, the gas turbine engine 10 defines an axial direction A (extending parallel to a longitudinal centerline 12 provided for reference), a radial direction R, and a circumferential direction (i.e., a direction extending about the axial direction A; not depicted). In general, the gas turbine engine 10 includes a fan section 14 and a turbomachine 16 disposed downstream from the fan section 14.

The exemplary turbomachine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust section 32. A high pressure (HP) spool or shaft 34 drivingly connects the HP turbine 28 to the HP compressor 24. A low pressure (LP) spool or shaft 36 drivingly connects the LP turbine 30 to the LP compressor 22. The compressor section and turbine section together define at least in part a core air flowpath 37. An exhaust of the core air flowpath 37 is located at an outlet of the jet exhaust section 32.

For the embodiment depicted, the fan section 14 includes a fan 38 having a plurality of fan blades 40 coupled to a disk 42 in a spaced apart manner. As depicted, the fan blades 40 extend outwardly from disk 42 generally along the radial direction R. It should be appreciated that in the exemplary embodiment depicted, the fan 38 is configured to be a variable pitch fan. The fan may be driven directly by LP shaft 36 or through a power gearbox 46. However, the fan 38 is provided by way of example only. In alternative embodiments, the fan may be a fixed pitched fan (direct or geared) or any other suitable fan. Each fan blade 40 is rotatable relative to the disk 42 about a pitch axis P by virtue of the fan blades 40 being operatively coupled to a suitable actuation member 44 configured to vary the pitch of the fan blades 40. The fan blades 40, disk 42, and actuation member 44 are together rotatable about the longitudinal centerline 12 by LP shaft 36 across the power gearbox 46. The power gearbox 46 includes a plurality of gears for stepping down the rotational speed of the LP shaft 36 to a more efficient rotational fan speed.

Referring still to the exemplary embodiment of FIG. 1, the disk 42 is covered by a rotatable front spinner 48 aerodynamically contoured to promote an airflow through the plurality of fan blades 40. Additionally, the exemplary fan section 14 includes an outer nacelle or a cowl assembly 50 that circumferentially surrounds the fan 38 and/or at least a portion of the turbomachine 16. It should be appreciated that the cowl assembly 50 may be configured to be supported relative to the turbomachine 16 by a plurality of circumferentially-spaced outlet guide vanes 55. Moreover, a downstream section 54 of the cowl assembly 50 may extend over an outer portion of the turbomachine 16 so as to define a bypass airflow passage 56 therebetween.

During operation of the gas turbine engine 10, a volume of air 58 enters the gas turbine engine 10 through an associated inlet 60 of the cowl assembly 50 and/or fan section 14. As the volume of air 58 passes across the fan blades 40, a first portion of the air 58 as indicated by arrows 62 (a "bypass airflow") is directed or routed into the bypass airflow passage 56 and a second portion of the air 58 as indicated by arrow 64 is directed or routed into the LP compressor 22. The second portion of air 64 may also be referred to as the core air flowpath 37. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 via sequential stage of HP turbine stator vanes 68 that are coupled to the outer casing 18 and HP turbine rotor blades 70 that are coupled to the HP shaft 34, thus causing the HP shaft 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft 36, thus causing the LP shaft 36 to rotate, thereby supporting operation of the LP compressor 22 and/or rotation of the fan 38.

The combustion gases 66 are subsequently routed through the jet exhaust section 32 of the turbomachine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the gas turbine engine 10, also providing propulsive thrust. The HP turbine 28, the LP turbine 30, and the jet exhaust section 32 at least partially define a hot gas path 78 for routing the combustion gases 66 through the turbomachine 16.

Shown aft of the cowl assembly 50 in FIG. 1, the hybrid electric gas turbine engine assembly further includes the electric machine assembly 200 is provided. The electric machine assembly 200 is shown coupled with the cowl assembly 50 of the gas turbine engine 10. It should be appreciated however, that the electric machine assembly 200 may be otherwise directly or indirectly aligned with the gas turbine engine 10. A shaft assembly 229 is shown connecting the turbomachine 16 of the gas turbine engine 10 with the electric machine assembly 200. The shaft assembly 229 may include various components of the gas turbine engine 10 and/or the electric machine assembly 200. For example, the shaft assembly 229 may include at least one of the HP shaft 34 and the LP shaft 36 of the gas turbine engine.

As shown in FIG. 1, the shaft assembly 229 includes a forward shaft 232 associated with the gas turbine engine 10, and more specifically coupled to the LP shaft 36.

As mentioned above, a shaft coupling 230 is provided to connect to the forward shaft 232 with an aft shaft 234 (or an "electric machine shaft"). The electric machine assembly 200 includes an electric machine 201 and an electric machine housing 220, with the electric machine 201 positioned in the electric machine housing 220. The aft shaft 234 is associated with the electric machine 201, for example as an input and/or output shaft of the electric machine 201 to transfer torque to the electric machine 201, from the electric machine 201, or both. The electric machine 201 may also be separately connected to or connectable with the aft shaft 234. The shaft coupling 230 as shown in the embodiment of FIG. 1 is configured to connect the forward shaft 232 of the gas turbine engine 10 with the electric machine assembly 200.

The electric machine 201 may generally include a rotor (not shown) rotatable with the aft shaft 234 and a stator (not shown) stationary relative to the electric machine housing 220, the electric machine 201 operable to convert electric power to mechanical power, mechanical power to electric power, or both. In such a manner the electric machine 201 may receive electric power and provide mechanical power to the engine 10, may receive/extract mechanical power from the engine 10 and provide electric power to an electrical sink, or both.

FIG. 1 further provides an electric machine assembly housing 240 of the electric machine assembly 200. As shown, the electric machine assembly housing 240 is disposed aft of the gas turbine engine. In the present embodiment, the electric machine assembly housing 240 is connectable with the gas turbine engine 10 through an assembly housing coupling 236. The assembly housing coupling 236 may connect to the cowl assembly 50 of the gas turbine engine 10 or to any other suitable component. Additionally, it should be appreciated that the assembly housing coupling 236 may be structural or non-structural, for example supporting the electric machine assembly 200 relative to the gas turbine engine or merely providing a flow surface between the gas turbine engine 10 and the electric machine assembly 200, for example with support of a mount assembly 300 as described just below.

As noted just above, the hybrid electric gas turbine engine assembly further includes the mount assembly 300 to support one or more of the gas turbine engine 10 and the electric machine assembly 200. As shown in FIG. 1, the mount assembly 300 connects to both the gas turbine engine 10 through its cowl assembly 50 and to the electric machine assembly 200 through its electric machine assembly housing 240. The mount assembly 300 may additionally connect to a wing of an aircraft (not shown) or may be part of a test assembly (not shown). In an embodiment, the mount assembly 300 is integral with a test assembly (not shown) configured to support the engine 10 in operation. In such a manner, it will be appreciated that the mount assembly 300 may be coupled to or configured to be coupled to a grounded structure (i.e., fixed relative to the ground).

Still referring to FIG. 1, flow through the hybrid electric gas turbine engine may be further defined beyond the bypass airflow passage 56 as described above. For example, an aft airflow passage 280 is defined aft of the bypass airflow passage 56 in the axial direction A. As defined, the aft airflow passage 280 begins at the end of the bypass airflow passage 56 and the jet exhaust section 32 (i.e., the core air flowpath exhaust. The aft airflow passage 280 thus includes core and bypass flows from the gas turbine engine 10 and controls them further aft or downstream in the axial direction A. The aft airflow passage 280 may be defined further, at least in part, circumferentially between the electric machine housing 220 of the electric machine assembly 200 and the electric machine assembly housing 240. The electric machine assembly housing 240 is radially exterior of the electric machine housing 220 of the electric machine assembly 200. As shown, the aft airflow passage 280 terminates in an electric machine assembly exhaust 270. It should be appreciated that the electric machine assembly 200, and more specifically the aft airflow passage 280 may define a nozzle aft of the turbomachine 16, and more specifically, aft of a tail cone 79 of the turbomachine 16.

Other aspects of the engine 10 and electric machine assembly 200 depicted in FIG. 1 not discussed hereinabove, such as a power supply 210, electric machine supply connection 222, supply passage 224, aft supports 250, electric machine sensor 290, and sensor 292, may be configured in a similar manner as the elements of the same name and reference number discussed below with reference to, e.g., FIGS. 2 and 3.

It should be appreciated that the exemplary gas turbine engine 10 depicted in FIG. 1 is by way of example only, and that in other exemplary embodiments, the gas turbine engine may have any other suitable configuration. For example, such a configuration could be adapted or adaptable to various other turboshaft, turboprop, or turbofan engines. Furthermore, as will be appreciated with the below discussion of the following figures, additional or alternative components and configurations may be provided.

Figure 2:
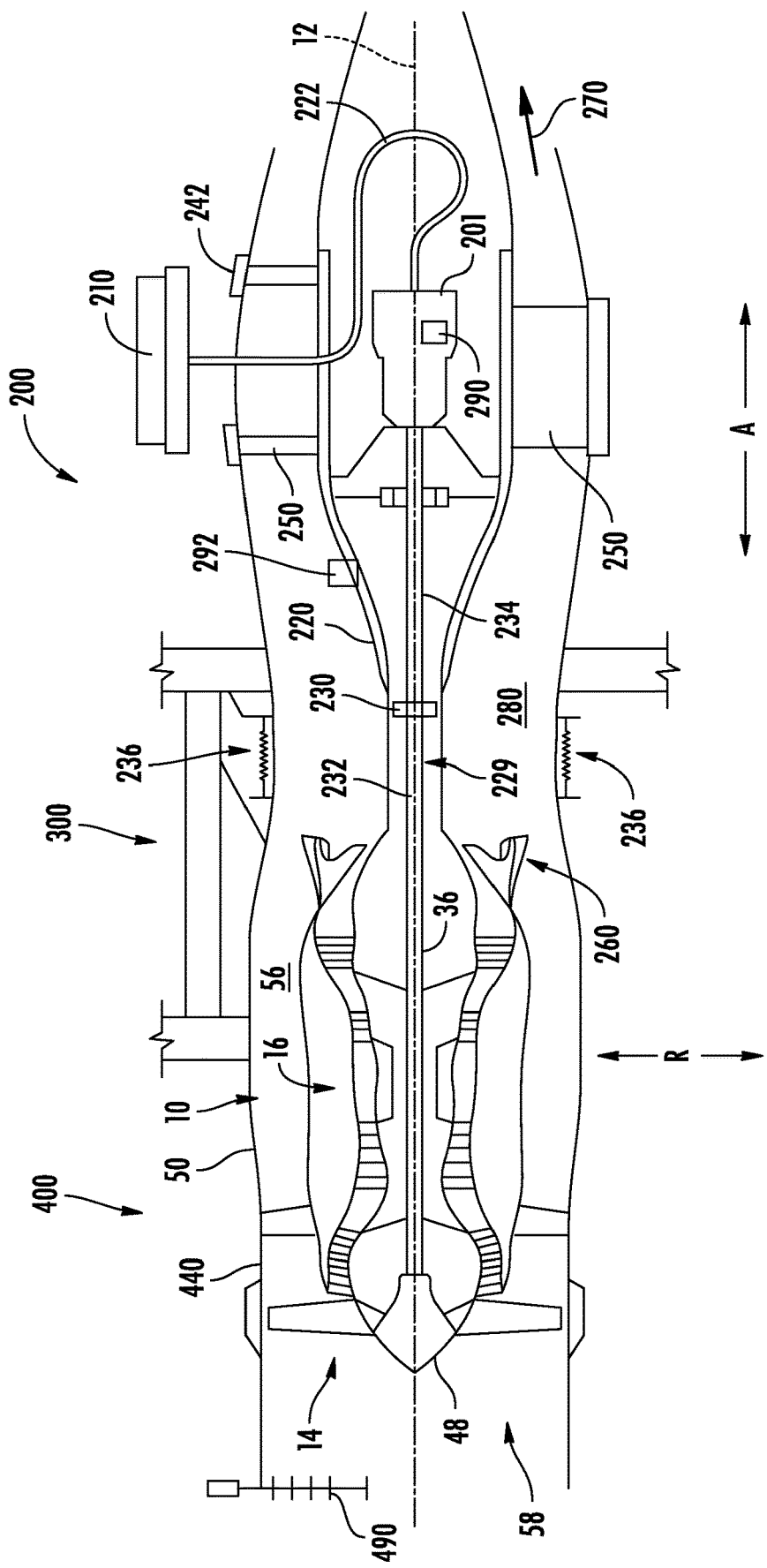
FIG. 2 is a schematic sectional view of a gas turbine engine and electric machine assembly in accordance with another exemplary aspect of the present disclosure.
Figure 3:
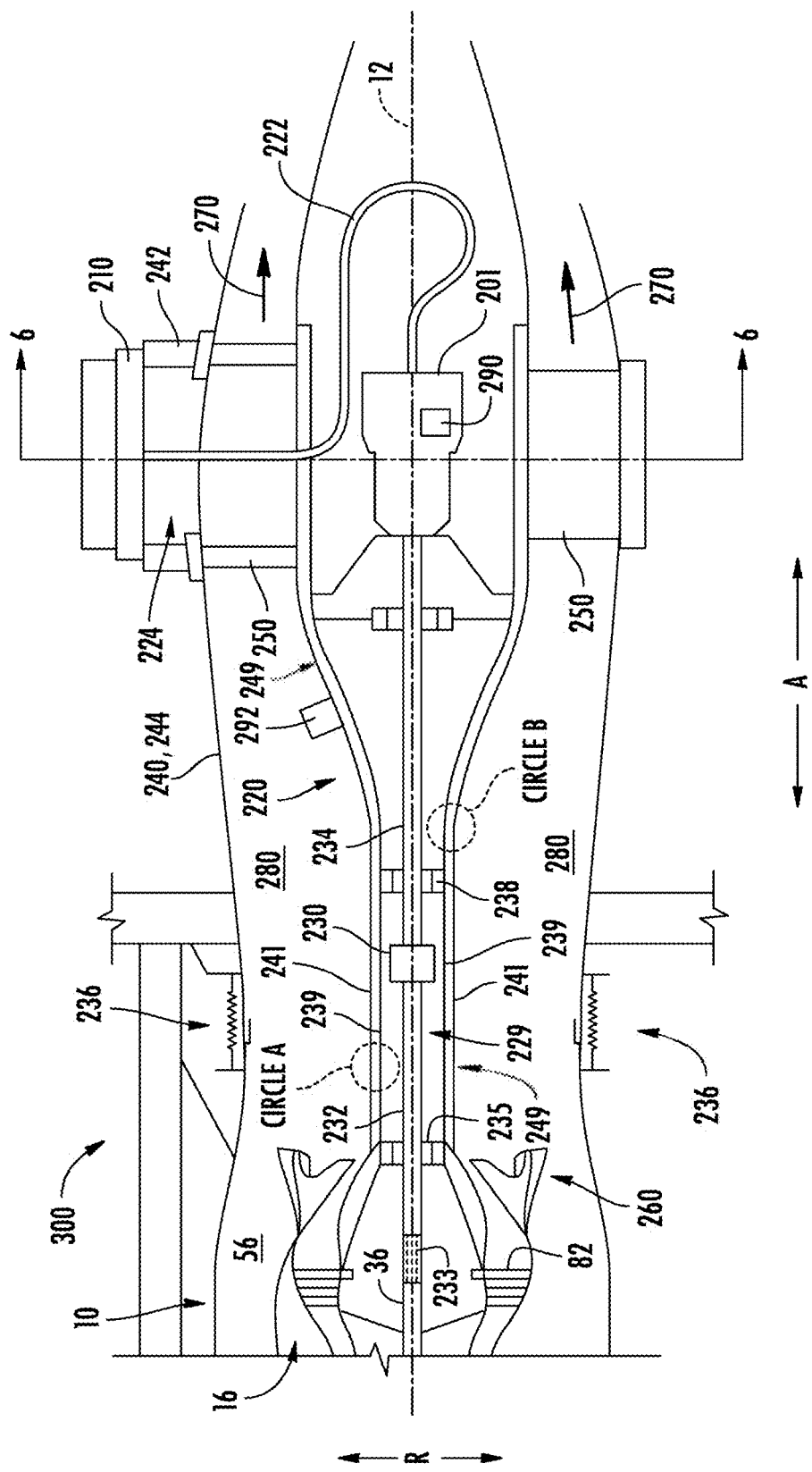
FIG. 3 is a close-up schematic sectional view of the gas turbine engine and electric machine assembly as shown in FIG. 2.

Turning now to FIGS. 2 and 3, another embodiment of a hybrid electric gas turbine engine assembly according to the present disclosure is provided. FIG. 2 shows an entire hybrid electric gas turbine engine assembly set up for testing and including a gas turbine engine 10, an electric machine assembly 200, a mount assembly 300, and a forward housing assembly 400. The forward housing assembly 400 may also be referred to as a cowl assembly as described above. In FIG. 2, however, the forward housing assembly 400 extends relatively far forward in the axial direction of the fan section 14. Such configuration may facilitate one or more testing procedures. For example, the forward housing assembly 400 may be configured to accommodate an inlet sensor 490 in its forward housing 440. The inlet sensor 490 may be configured to read one or more of an inlet temperature, inlet air speed, water content, etc. The inlet sensor 490 may be configured to provide one or more output signals to a controller (not shown).

The forward housing assembly 400 as above includes a forward housing 440. The forward housing 440 may be connectable with an existing cowl assembly 50 of the gas turbine engine or may be integral therewith.

It should be appreciated that the forward housing 440 may also be omitted as in the embodiment of FIG. 1.

Still referring to FIGS. 2 and 3, a mixer assembly 260 is further provided. The mixer assembly 260 is configured to mix an airflow from the core air flowpath 37 and the bypass airflow passage 56 and provide the airflow to the aft airflow passage 280. For example, the mixer assembly 260 may be configured to provide efficient flow through the aft airflow passage 280. As shown, the mixer assembly 260 is configured as a mixer/nozzle so that hot core exhaust can produce thrust when mixed with air from the bypass airflow passage 56.

As is also depicted in FIGS. 2 and 3, the shaft assembly 229 includes a forward shaft 232 associated with the gas turbine engine 10, and more specifically coupled to the LP shaft 36. More specifically, referring particularly to FIG. 3 for the embodiment depicted, the LP shaft 36 and the forward shaft 232 together form a spline connection 233, which may allow for the transfer of torque in a circumferential direction, while also allowing for some relative movement between the forward shaft 232 and the LP shaft 36 along the axial direction A.

To enclose the forward shaft 232, the electric machine assembly 200 includes an electric machine housing 220 having an inner liner 239 and an outer liner 241. The inner liner 239 and outer liner 241 may each be fixed to a structure of the turbomachine 16 (e.g., a turbine rear frame 82 of the turbomachine 16) and to a structure of the electric machine assembly 200 (e.g., the one or more aft supports 250 (described below)). Notably, the inner liner 239, the outer liner 241, or both may include flexible structures to allow expansion along the axial direction A (similar to operation of the spline connection 233).

Figure 4:
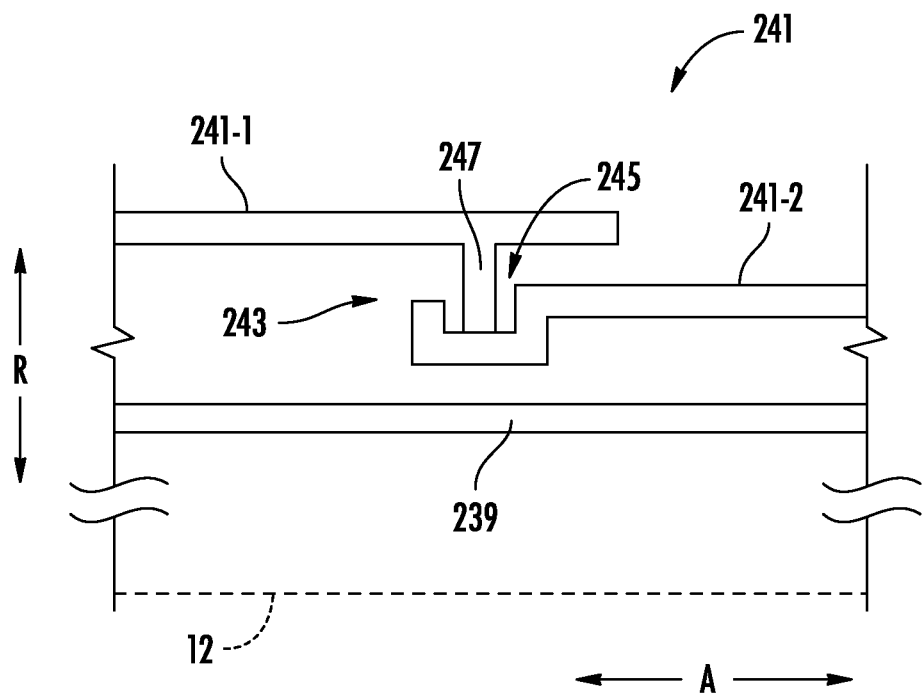
FIG. 4 is a close-up view of Circle A in FIG. 3.

In particular, referring specifically to FIG. 4, providing a close-up view of Circle A in FIG. 3, the outer liner 241 includes a forward section 241-1 and an aft section 241-2. The forward and aft sections 241-1, 241-2 together form a piston seal 243. More specifically, the aft section 241-2 includes a circumferential groove 245 with a circumferential seal element 247 positioned within the circumferential groove 245 configured to contact an inner surface of the forward section 241-1 and slidably engage with the inner surface of the forward section 241-1. Such a configuration may allow for the forward and aft sections 241-1, 241-2 to move relative to one another during operation while maintaining a fluid-tight seal between a radially inner portion and a radially outer portion.

Figure 5:
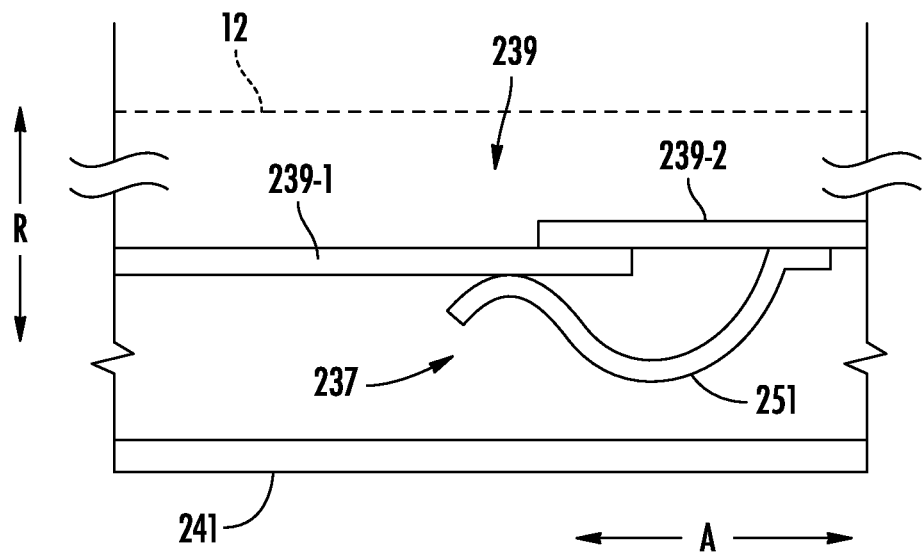
FIG. 5 is a close-up view of Circle B in FIG. 3.

Further, referring specifically to FIG. 5, providing a close-up view of Circle B in FIG. 3, the inner liner 239 similarly includes a forward section 239-1 and an aft section 239-2. The forward and aft sections 239-1, 239-2 together form a feather seal 237. More specifically, the aft section 239-2 includes a flexible seal element 251 configured to extend circumferentially and press against an outer surface of the forward section 239-1 to form a fluid-tight seal between a radially inner portion and a radially outer portion of the inner liner 239. Such a configuration may allow for the forward and aft sections 239-1, 239-2 to move relative to one another during operation while maintaining a fluid-tight seal between a radially outer portion and a radially inner portion.

Such a configuration of the inner and outer liners 239, 241 may allow for the assembly to operate at the normal operating conditions, facilitating the temperature variations across the length of the electric machine assembly 200.

As discussed above with reference to FIG. 1, a shaft coupling 230 and an assembly housing coupling 236 may also be provided. In the embodiment of FIGS. 2 and 3, the shaft coupling 230 is configured as a flexible coupling. This flexible coupling may be referred to as a flex coupling and may include any combination of universal, constant-velocity, or other configurations of couplings. The flexible coupling configuration of the shaft coupling 230 may facilitate ease of connection between the gas turbine engine 10 and the electric machine assembly 200, for example by accounting for misalignment therebetween. It should be appreciated that the gas turbine engine 10 undergoes significant temperature changes that the shaft coupling 230 may be configured to account for. Additionally or alternatively, the shaft coupling 230 may be configured to account for manufacturing changes or tolerances to facilitate operation of the electric machine assembly 200 with different gas turbine engines 10.

The shaft assembly 229 as shown in FIGS. 2 and 3 may be supported with one or more bearings. For example, FIG. 3 depicts a forward shaft bearing 235 configured to support the forward shaft 232 and an aft shaft bearing 238 configured to support the aft shaft 234. The shaft bearings 235, 238 may be configured as roller bearings, thrust bearings, air bearings, or any other suitable configuration of bearing.

As shown in FIGS. 2 and 3, the electric machine housing 220 may be configured as an aerodynamic surface. As discussed above with reference to FIG. 1, the electric machine housing 220 cooperates with the electric machine assembly housing 240 to define the aft airflow passage 280 in the radial direction R. Accordingly, the electric machine housing 220 and the electric machine assembly housing 240 may together cooperate to control flow effectively through the aft airflow passage 280 and the electric machine assembly exhaust 270 as discussed above.

Still referring to FIGS. 2 and 3, the assembly housing coupling 236 may be a flexible coupling. For example, the assembly housing coupling 236 may be configured as a bellows as shown in FIGS. 2 and 3. A bellows configuration of the assembly housing coupling 236 may be structural to support the electric machine assembly 200 relative to the gas turbine engine. Additionally or alternatively, a flexible coupling and/or bellows configuration of the assembly housing coupling 236 may be provided to maintain flow between the gas turbine engine 10 and the electric machine assembly 200.

The electric machine 201 is configured to receive power from and/or provide power to a power supply 210. As shown in FIGS. 2 and 3, the power supply 210 is provided external to the electric machine housing 220 and further external to the electric machine assembly housing 240. However, it should be appreciated that the power supply 210 may be provided elsewhere, for example disposed with the electric machine housing 220 and/or the electric machine assembly housing 240. As shown, the power supply 210 is mounted to the electric machine assembly housing 240 with an electric machine assembly housing mount 242. The power supply 210 is connected to the electric machine 201 through an electric machine supply connection 222. The electric machine supply connection 222 may be fed through various paths, passages, or other connections as described in connection with FIGS. 3 and 4 as discussed further below.

Still referring to FIGS. 2 and 3, one or more sensors may be provided with the hybrid electric gas turbine engine as shown. For example, the inlet sensor 490 as described may provide feedback or other information for operation, tuning, or diagnosis (FIG. 2). Additionally, an electric machine sensor 290 may be provided as part of or in the direct vicinity of the electric machine 201, for example inside the electric machine housing 220. The electric machine sensor 290 may provide feedback or other information about operation of the electric machine 201, for example shaft speeds, temperatures, current draw, vibrations, etc. A sensor 292 may also be provided. The sensor 292 may be disposed external to the electric machine housing 220. In an embodiment, the sensor 292 is configured to measure characteristics of the flow through the aft airflow passage 280. For example, the sensor 292 may measure flow rates, temperatures, oxygen content, vibrations, etc. of the aft airflow passage 280. It will be appreciated, however, that the sensor 292 may be positioned at any other suitable location (e.g., forward or aft of the electric machine 201 within the electric machine housing 220). Additionally, or alternatively, the sensor 292 may include a plurality of sensors positioned at any suitable location to measure a flow rate, temperature, oxygen content, vibration, etc. at any suitable location of interest. While not shown the electrical machine sensor 290 and the sensor 292 may be communicatively and operably coupled with any suitable controllers.

Figure 6:
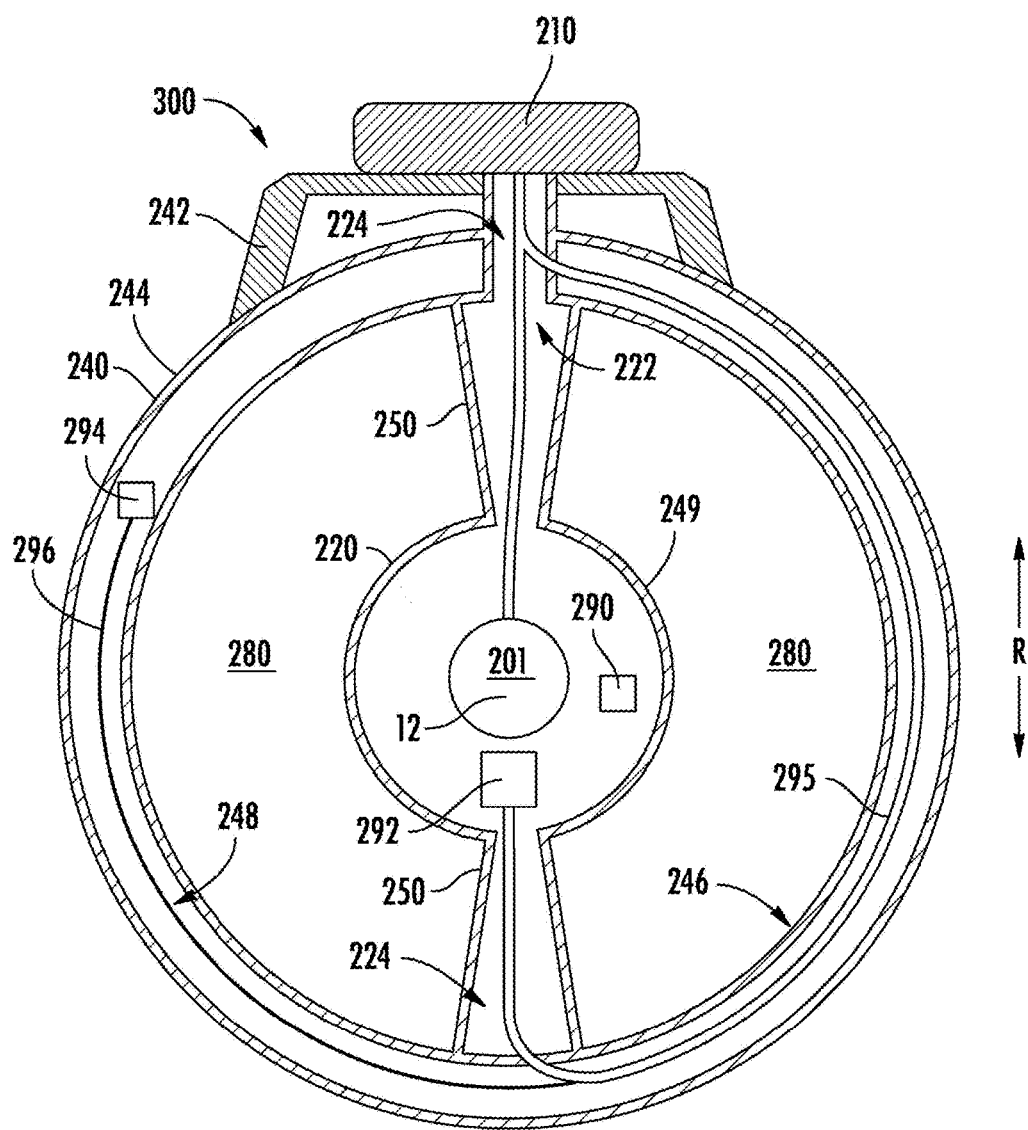
FIG. 6 is a schematic cross-sectional view of the gas turbine engine and electric machine assembly of FIG. 3.

Turning now to FIG. 6, a cross-sectional view of the embodiment of FIG. 3 is shown schematically as indicated by line 4-4 in FIG. 3. As shown in FIG. 6, the aft airflow passage 280 can be seen defined radially between a housing wall 249 of the electric machine housing 220 and an interior wall 246 of the electric machine assembly housing 240. Also shown is an exterior wall 244 defining an outer extent of the electric machine assembly housing 240. Between the interior wall 246 of the electric machine assembly housing 240 and the exterior wall 244 of the electric machine assembly housing 240, the electric machine assembly housing 240 may further define an assembly housing passage 248. The assembly housing passage 248 may be configured to house the electric machine supply connection 222 at least in part, as discussed just below.

As shown in FIG. 6, a plurality of aft supports 250 may be provided. The present embodiment depicts two aft supports 250, but it should be appreciated that any number of aft supports 250 may be provided spaced circumferentially about the electric machine 201. Each of the aft supports 250 connects the electric machine housing 220 of the electric machine 201 to the electric machine assembly housing 240. One or more of the aft supports 250 may further comprise a supply passage 224. For example, as shown in FIG. 6, each of the aft supports 250 includes a supply passage 224. However, it should be appreciated that only one or some of a plurality of the aft supports 250 may include such a supply passage 224 as discussed below.

Still referring to FIG. 6, the supply passage 224 is configured to house at least part of the electric machine supply connection 222. As shown, the electric machine supply connection 222 connects the electric machine 201 to the power supply 210 through at least one of the supply passages 224 of the respective aft supports 250. The electric machine supply connection 222 may be directly fed from the power supply 210 disposed outside of the electric machine assembly housing 240 or may also be fed through the assembly housing passage 248. As shown in the exemplary embodiment of FIG. 6, in addition to the direct connection, a first connection path 295 is provided through the assembly housing passage 248 to an opposing side of the electric machine housing 220 and a second connection path 296 is provided through the housing assembly passage to a wall sensor 294. The wall sensor may be provided to monitor internal conditions of the assembly housing passage 248 or connected parts, for example to monitor temperature and humidity that may affect the operation of the electric machine. It should be appreciated that the various pathways may accommodate different components of the electric machine supply connection 222 or other connections, for example separated by relatively high and low voltages or by source or destination.

In addition to the benefits noted above, it will be appreciated that a hybrid electric gas turbine engine assembly of the present disclosure may also allow for removal of an electric machine assembly from a gas turbine engine. In particular, by positioning the electric machine of the electric machine assembly aft of the core air flowpath exhaust, the electric machine may be removed to facilitate repair or replacement without disassembly of the gas turbine engine.

It will be appreciated that the various embodiments described hereinabove and depicted in FIGS. 1 through 6 are provided by way of example only. In other exemplary embodiments of the present disclosure, the engine, the electric machine assembly, or both may not include each of the features described above, or may include any combination of the features described above. For example, in other embodiments of the present disclosure, the bearings depicted in FIGS. 2 and 3 can be included in the embodiment of FIG. 1, the assembly housing coupling in FIG. 1 may include the bellows configuration disclosed with respect to FIGS. 2 and 3, etc.

Further aspects are provided by the subject matter of the following clauses:

A hybrid electric gas turbine engine assembly, comprising: a gas turbine engine comprising a turbomachine, the turbomachine comprising a compressor section and a turbine section arranged in serial flow order, the compressor section and turbine section together defining a core air flowpath, the turbomachine defining a core air flowpath exhaust; and an electric machine assembly comprising an electric machine disposed aft of the core air flowpath exhaust and mechanically connected to the turbine section.

The hybrid electric gas turbine engine assembly of any of the preceding clauses, wherein the gas turbine engine provides combustion gasses through the core air flowpath exhaust as a core exhaust airflow, and wherein the electric machine is positioned to be inward of the core exhaust airflow.

The hybrid electric gas turbine engine assembly of any of the preceding clauses, wherein the gas turbine engine defines a bypass airflow passage extending over the turbomachine, wherein the gas turbine engine provides a bypass airflow through the bypass passage, and wherein the electric machine is positioned to be inward of the bypass airflow The hybrid electric gas turbine engine assembly of any of the preceding clauses, further comprising: a tail cone, and wherein the electric machine assembly is located aft of the tail cone.

The hybrid electric gas turbine engine assembly of any of the preceding clauses, further comprising: an aft airflow passage defined between an electric machine housing of the electric machine and the electric machine assembly housing, wherein the core air flowpath exhaust merges into the aft airflow passage.

The hybrid electric gas turbine engine assembly of any of the preceding clauses, wherein the electric machine housing includes an inner liner and an outer liner, wherein the inner liner and the outer liner each include one or more flexible structures to allow expansion along an axial direction of the hybrid electric gas turbine engine.

The hybrid electric gas turbine engine assembly of any of the preceding clauses, wherein the hybrid electric gas turbine engine defines a nozzle, and wherein the nozzle is located in the aft airflow passage at a location aft of the electric machine.

The hybrid electric gas turbine engine assembly of any of the preceding clauses, wherein the electric machine assembly further comprises an electric machine shaft and a shaft coupling mechanically coupling the electric machine to the turbine section, wherein the electric machine shaft is configured to transfer a torque to a shaft assembly of the turbine section, from the shaft assembly, or both through the shaft coupling.

The hybrid electric gas turbine engine assembly of any of the preceding clauses, wherein the shaft coupling is a flexible coupling.

The hybrid electric gas turbine engine assembly of any of the preceding clauses, wherein the turbine section comprises a shaft assembly, wherein the electric machine assembly further comprises an electric machine shaft, wherein the electric machine is mechanically coupled to the turbine section through the shaft assembly and the electric machine shaft, and wherein the shaft assembly, the electric machine shaft, or both form a splined connection.

The hybrid electric gas turbine engine assembly of any of the preceding clauses, wherein the electric machine assembly is connected to a cowl assembly of the hybrid electric gas turbine engine through an assembly housing coupling.

The hybrid electric gas turbine engine assembly of any of the preceding clauses, further comprising at least one support connecting the electric machine to an electric machine assembly housing, the at least one support located aft of the turbomachine.

The hybrid electric gas turbine engine assembly of any of the preceding clauses, wherein a supply connection provides power to the electric machine from an electric machine power supply, the electric machine power supply disposed outside of the electric machine assembly housing.

The hybrid electric gas turbine engine assembly of any of the preceding clauses, wherein the at least one support comprises a plurality of supports spaced circumferentially about the electric machine.

The hybrid electric gas turbine engine assembly of any of the preceding clauses, further comprising: a mount assembly connecting the gas turbine engine, the electric machine assembly, or both.

An electric machine assembly for a gas turbine engine assembly having a gas turbine engine, the electric machine assembly comprising: a shaft coupling configured to connect a shaft assembly of the gas turbine engine with the electric machine assembly; an assembly housing coupling configured to connect a cowl assembly of the gas turbine engine with the electric machine assembly; and an electric machine disposed aft of the cowl assembly when the shaft coupling is connected to the shaft assembly and the assembly housing coupling is connected to the cowl assembly.

The electric machine assembly of any of the preceding clauses, wherein the electric machine is configured to transfer a torque to or from the shaft assembly of the gas turbine engine.

The electric machine assembly of any of the preceding clauses, wherein the electric machine assembly further comprises an electric machine shaft, wherein the electric machine shaft is configured to input the torque to the shaft assembly of the gas turbine engine, from the shaft assembly, or both through the shaft coupling.

The electric machine assembly of any of the preceding clauses, wherein the shaft coupling is a flexible coupling.

The electric machine assembly of any of the preceding clauses, further comprising at least one support connecting the electric machine to an electric machine assembly housing.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

We claim:

1. A hybrid electric gas turbine engine assembly, comprising:
    a gas turbine engine comprising a fan section and a turbomachine disposed aft of the fan section,
    the turbomachine comprising a compressor section and a turbine section arranged in serial flow order,
    the compressor section and turbine section together defining a core air flowpath,
    the turbomachine defining a core air flowpath exhaust,
    wherein the gas turbine engine defines a bypass airflow passage extending over the turbomachine, and
    wherein the gas turbine engine provides a bypass airflow through the bypass airflow passage;
    an electric machine assembly comprising an electric machine disposed aft of the core air flowpath exhaust and mechanically connected to the turbine section;
    an aft airflow passage defined between an electric machine housing of the electric machine and an electric machine assembly housing of the electric machine assembly,
    wherein combustion gasses are provided through the core air flowpath exhaust as a core exhaust airflow, and
    wherein the core exhaust airflow and the bypass airflow merge into the aft airflow passage; and
    at least one support disposed in the aft airflow passage and connecting the electric machine to the electric machine assembly housing, the at least one support located aft of the turbomachine.

2. The hybrid electric gas turbine engine assembly of claim 1, wherein the electric machine is positioned to be radially inward of the core exhaust airflow.

3. The hybrid electric gas turbine engine assembly of claim 1, wherein the electric machine is positioned to be radially inward of the bypass airflow.

4. The hybrid electric gas turbine engine assembly of claim 1, further comprising:
    a tail cone, and wherein the electric machine assembly is located aft of the tail cone.

5. The hybrid electric gas turbine engine assembly of claim 1, wherein the electric machine housing includes an inner liner and an outer liner, wherein the inner liner and the outer liner each include one or more flexible structures to allow expansion along an axial direction of the gas turbine engine.

6. The hybrid electric gas turbine engine assembly of claim 1, wherein the gas turbine engine defines a nozzle, and wherein the nozzle is located in the aft airflow passage at a location aft of the electric machine.

7. The hybrid electric gas turbine engine assembly of claim 1, wherein the electric machine assembly further comprises an electric machine shaft and a shaft coupling mechanically coupling the electric machine to the turbine section,
    wherein the electric machine shaft is configured to transfer a torque to the electric machine and from the electric machine to a shaft assembly of the turbine section, from the shaft assembly, or both to the shaft assembly of the turbine section and from the shaft assembly through the shaft coupling.

8. The hybrid electric gas turbine engine assembly of claim 7, wherein the shaft coupling is a flexible coupling.

9. The hybrid electric gas turbine engine assembly of claim 1, wherein the turbine section comprises a shaft assembly, wherein the electric machine assembly further comprises an electric machine shaft, wherein the electric machine is mechanically coupled to the turbine section through the shaft assembly and the electric machine shaft, and wherein the shaft assembly, the electric machine shaft, or both form a splined connection.

10. The hybrid electric gas turbine engine assembly of claim 1, wherein the electric machine housing of the electric machine assembly is connected to a cowl assembly of the gas turbine engine through an assembly housing coupling, the cowl assembly at least partially surrounding the turbomachine.

11. The hybrid electric gas turbine engine assembly of claim 1, wherein a supply connection provides power to the electric machine from an electric machine power supply, the electric machine power supply disposed outside of the electric machine assembly housing.

12. The hybrid electric gas turbine engine assembly of claim 1, wherein the at least one support comprises a plurality of supports spaced circumferentially about the electric machine.

13. The hybrid electric gas turbine engine assembly of claim 1, further comprising:
a mount assembly connecting a cowl assembly of the gas turbine engine and the electric machine assembly housing of the electric machine assembly.

\* \* \* \* \*